UNITED STATES PATENT OFFICE.

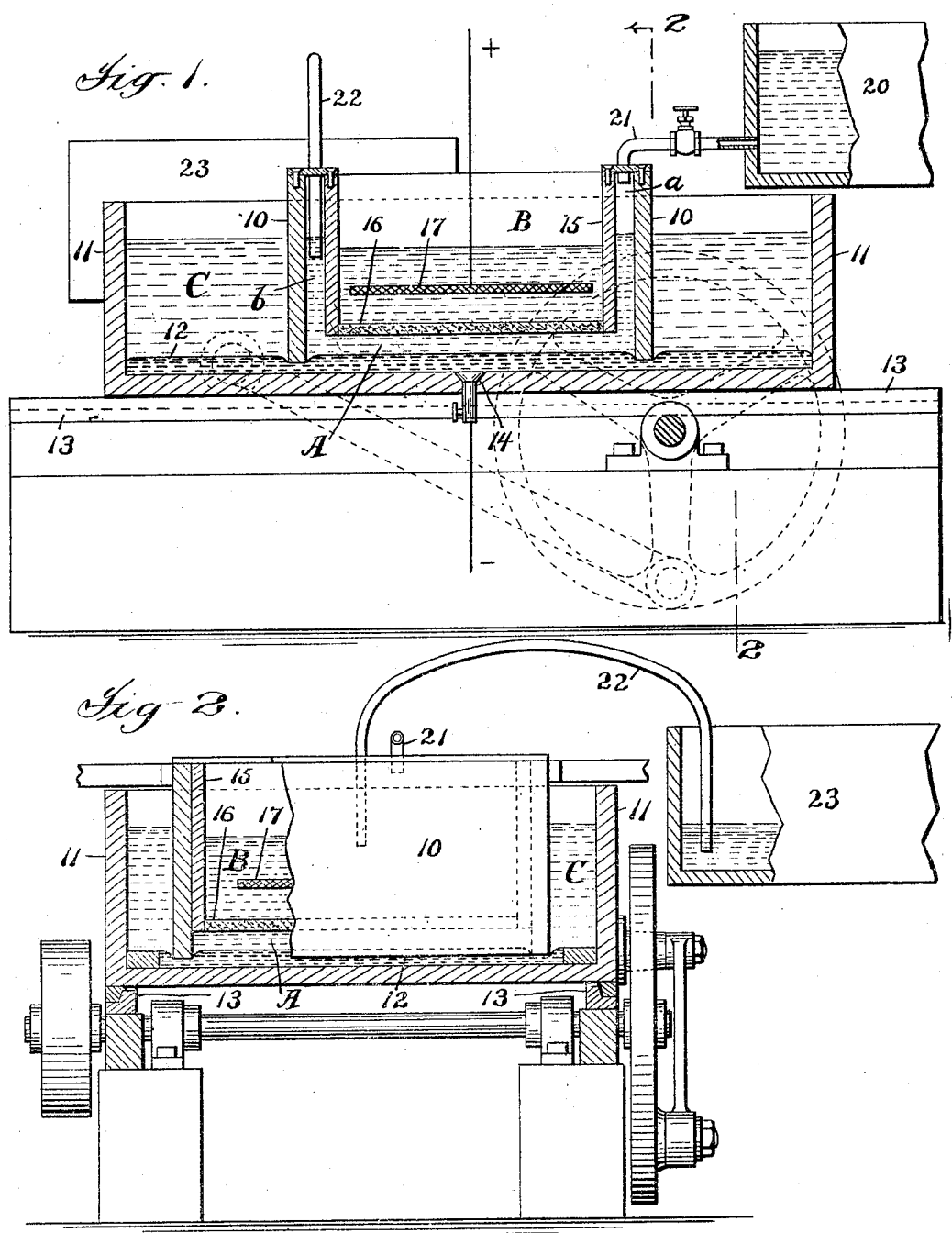

HENRY S. ANDERSON, OF EL PASO, TEXAS.

ELECTROLYTIC CELL.

No. 803,263.  Specification of Letters Patent.  Patented Oct. 31, 1905.

Application filed June 21, 1905. Serial No. 266,229.

*To all whom it may concern:*

Be it known that I, HENRY S. ANDERSON, a citizen of the United States, residing at El Paso, county of El Paso, and State of Texas, have invented certain new and useful Improvements in Electrolytic Cells, fully described and represented in the following specification and the accompanying drawings, forming a part of the same.

This invention relates to electrolytic cells especially adapted and intended for the electrolyzing of the sulfates of the alkalies to obtain sulfuric acid and alkaline hydrates, the particular alkaline hydrate produced depending on the particular sulfate treated.

The invention aims generally to provide a cell which may be worked continuously and which shall be efficient and economical in operation.

One object of the invention is to provide a mercury cell which shall be adapted for the decomposition of the sulfates of the alkalies. Mercury cells—that is, cells in which the electric current passes from the electrolyte or solution of the substance to be decomposed to a body of mercury in which the metal ions or base constituents of the electrolyte are deposited and form an amalgam from which the metal is subsequently recovered—have been used heretofore for the decomposition of alkaline chlorids; but such cells as heretofore constructed cannot be used for the decomposition of sulfates. In accordance with the present invention cells of this class are adapted for the decomposition of alkaline sulfates by providing an anode-compartment separated from the electrolyte-compartment by a porous diaphragm.

In decomposing alkaline sulfates by means of an electrolytic cell in which the sulfate solution is separated from the solution of the acid product of decomposition by a diaphragm difficulty has been experienced due to the fact that more or less acid becomes diffused in the sulfate solution, and another object of the present invention is to overcome this difficulty. This is done by providing means for causing a movement, preferably a constant flow, of the sulfate solution through the electrolyte-compartment of the cell. By suitably regulating such movement of the sulfate solution the amount of acid allowed to form or collect therein may be limited to any desired degree. After passing through the cell the sulfate may be freed of the acid and returned to be again passed through the cell. In order to reduce the amount of sulfate solution required for the operation of such a cell, the electrolyte-compartment of the cell is preferably of a thin or flat form, its dimension in a direction perpendicular to the face of the diaphragm being small as compared to the surface dimensions of the diaphragm.

A full understanding of the invention can best be given by a detailed description of a preferred form of cell embodying the various features of the invention, and such a description will now be given in connection with the accompanying drawings showing such a cell.

In said drawings, Figure 1 is a longitudinal sectional view of the cell. Fig. 2 is a view, partly in section, on line 2 of Fig. 1.

Referring to the drawings, the apparatus or cell, as shown, comprises an electrolyte-compartment A, an anode-compartment B, and a washing compartment or chamber C. The electrolyte-compartment A is formed by an open-bottom tank or cell 10, which is stationarily supported within a tank 11, the lower edges of the sides of the cell 10 extending close to the bottom of the tank 11, so as to be sealed by a layer of mercury 12 in the tank 11. The space within the tank 11 about the cell 10 forms the washing-chamber and contains water or other suitable liquid for recovering from the mercury the alkaline metal which has been deposited therein. The tank 11 is considerably longer than the cell 10 and of a width sufficient to leave connecting-passages about each side of the cell 10 and is mounted to slide horizontally on ways 13, on which in the operation of the apparatus it is slowly reciprocated, as by means of a crank-wheel and connecting-rod, as shown in the drawings. By such reciprocating motion of the tank 10 the various portions of the layer of mercury in the bottom thereof will be presented successively to the electrolyte in the compartment A and to the water or other liquid contained in the tank 11. The layer of mercury 12 is connected in the electric circuit by means of a contact 14 in the bottom of the tank 11, to which the wire from the negative pole of the battery or other generator is connected, the mercury thus forming the negative electrode or cathode of the cell. This arrangement of the stationary electrolyte-compartment and the reciprocating washing-chamber with the layer of mercury forming the cathode and sealing the bottom of the electrolyte-chamber is shown in Patent No. 679,476 to John F. Kelly, dated July 30, 1901, and provides a preferred arrangement for causing the surface of the mercury to be presented successively to the electrolyte and to the washing liquid.

The anode-compartment B is formed by a cell 15, mounted within the cell 10, preferably so as to be removable therefrom, and having a bottom formed by a plate or diaphragm 16 of suitable porous material for mechanically separating the solution of the acid product of decomposition contained in the anode-compartment B from the electrolyte in the compartment A, while permitting said solutions to be electrically in contact across the diaphragm. The anode is preferably formed by a plate 17 of suitable material suspended within the compartment B. The diaphragm 16 will thus lie between the anode and the mercury cathode 12, and the electrolyte in the compartment A will lie between the diaphragm and the mercury cathode.

In the apparatus shown the arrangement is such that the electrodes face each other and the diaphragm and the electrolyte lie directly between them—that is, so that a straight line or lines passing from the anode to the cathode would pass through the diaphragm and through the electrolyte; but it will be understood that in defining in the claims the position of the diaphragm as being between the anode and the cathode and the position of the electrolyte as being between the diaphragm and cathode it is not intended to limit the claims to a construction in which the diaphragm is thus directly between the anode and the cathode or the electrolyte is thus directly between the diaphragm and the cathode, but that the expression is used with reference to the path of the current from the anode to the cathode.

The cell 15 is preferably of a size to extend clear across the cell 10 and close the space between it and the side walls of the cell 10 in one direction and to leave a space between it and the other side walls of the cell 10, thus providing inflow and outflow passages $a$ and $b$ for the electrolyte and preventing the passage of the same about the other sides of the cell 15, so that by supplying the electrolyte to the inflow-passage $a$ and taking it from the outflow-passage $b$ the electrolyte may be caused to flow through the main portion of the compartment A between the diaphragm and the mercury cathode.

Any suitable means may be provided for supplying and drawing off the electrolyte. As shown, it flows from a supply-tank 20, through an inlet-pipe 21, into the inlet-passage $a$, and is drawn from the outlet-passage $b$ by a siphon 22, emptying into a receiving-tank 23. By providing a valve in the inlet-pipe 21, as shown, the rate of flow of the electrolyte through the chamber A may be controlled as desired. In order to reduce the amount of electrolyte necessary to be used to maintain the same free of acid to the desired degree, the cell 15 is preferably placed with its diaphragm quite close to the layer of mercury 12, so that the electrolyte-compartment will contain only a thin layer or body of the electrolyte and a comparatively small amount of the electrolyte will thus fill the compartment. Any suitable means may be provided for supplying water to the anode-compartment B and for drawing off the solution of sulfuric acid continuously or at intervals to maintain the solution in the compartment at the desired strength. Any suitable means also may be provided for supplying the water or other washing liquid to the washing-compartment C and for drawing off the solution containing the metallic hydrate.

In the operation of the apparatus for producing sulfuric acid and sodium hydrate from the decomposition of sulfate of sodium the anode-compartment B will contain an aqueous solution of sulfuric acid, the chamber $c$ will contain an aqueous solution of sodium hydrate, and the electrolyte-compartment A will contain the solution of sodium sulfate supplied from the supply-tank 20 and drawn off and maintained at a constant level in the inlet and outlet branches $a$ and $b$ by means of the siphon 22.

By the action of the electric current the sulfate in the compartment A will be decomposed into its acid constituent $SO_4$ and its base constituent Na, and these two constituents are dissociated, the acid radicals $SO_4$ being carried by the current through the diaphragm into the anode-compartment B, where they combine with water to form sulfuric acid, and the base radicals Na going to the mercury to combine therewith to form an amalgam. By the horizontal reciprocation of the tank 11 the sodium-charged mercury is transferred from the compartment A to the chamber C, and thereby exposed to the washing or oxidizing action of the water by which sodium hydrate or caustic soda is produced, and a new surface of mercury is brought into contact with the electrolyte to become charged with sodium. The whole extent of the layer of mercury will thus be alternately charged and washed. The sodium hydrate as it is formed will thus be kept separated from the electrolyte by means of the layer of mercury which forms a seal for the bottom of the electrolyte-compartment A, and the sulfuric acid formed in the compartment B will also be kept separated from the electrolyte by means of the diaphragm, and these two products of decomposition of the sulfate will thus be obtained in a substantially pure state. Notwithstanding the interposition of the diapragm between the sulfuric-acid solution and the electrolyte, however, it is found in practice, as hereinbefore pointed out, that some sulfuric acid will become diffused in the electrolyte; but by reason of the movement of the layer of the electrolyte through the compartment A the accumulation of the acid in the electrolyte in the cell will be prevented and the effect of the formation or appearance of the acid therein thus practically nullified.

As a further means for limiting the amount of acid in the electrolyte the electrolyte is preferably caused to bear against the diaphragm with a pressure slightly greater than the pressure of the acid solution against the opposite side of the diaphragm, whereby a greater resistance will be offered to movement of the sulph ions through the diaphragm into the electrolyte. Such greater pressure of the electrolyte may be readily attained by maintaining the level of the electrolyte in the inlet and outlet branches $a$ and $b$ somewhat above the level of the acid solution in the compartment B. The electrolyte may be readily maintained at a desired level with the apparatus shown by maintaining the level of the liquid in the receiving-tank 23 at a corresponding level.

It will be understood that the invention is not to be limited to the exact construction and arrangement of parts shown in the drawings and to which the foregoing description has been mainly confined, but that it includes changes and modifications thereof within the claims. It will be also understood that parts or features of the invention as claimed may be employed independently of other parts thereof.

What is claimed is—

1. In an electrolytic cell, the combination of an anode and a mercury cathode, a porous diaphragm between the anode and the cathode, and means for causing a solution of the substance to be decomposed to flow between and in contact with the diaphragm and the mercury cathode, substantially as described.

2. In an electrolytic cell, the combination of an anode and a mercury cathode, a porous diaphragm between the anode and the cathode, and means for causing a thin layer or body of a solution of the substance to be decomposed to flow between and in contact with the diaphragm and the mercury cathode, substantially as described.

3. In an electrolytic cell, the combination of an electrolyte-compartment, an anode-compartment separated from the electrolyte-compartment by a porous diaphragm, a mercury cathode in the electrolyte-compartment, and means for replacing the electrolyte in the electrolyte-compartment with fresh electrolyte to prevent the accumulation of acid therein, substantially as described.

4. In an electrolytic cell, the combination of an electrolyte-compartment, an anode-compartment separated from the electrolyte-compartment by a porous diaphragm, a mercury cathode in the electrolyte-compartment, and means for continuously replacing the electrolyte in the electrolyte-compartment with fresh electrolyte to prevent the accumulation of acid therein, substantially as described.

5. In an electrolytic cell, the combination of an electrolyte-compartment, an anode-compartment separated from the electrolyte-compartment by a porous diaphragm, an anode in the anode-compartment, a mercury cathode in the electrolyte-compartment, a washing-chamber, means for causing a solution of the substance to be decomposed to flow through the electrolyte-compartment in contact with the diaphragm and with the mercury cathode, and means for causing the mercury to be in contact successively with the solution in the electrolyte-compartment and with the liquid in the washing-chamber, substantially as described.

6. In an electrolytic cell, the combination of an electrolyte-compartment, an anode-compartment separated from the electrolyte-compartment by a porous diaphragm, a mercury cathode in the electrolyte-compartment, and means for causing a solution of the substance to be decomposed to flow through the electrolyte-compartment and to bear against the diaphragm with a pressure greater than the pressure of the liquid in the anode-compartment against the diaphragm, substantially as described.

7. In an electrolytic cell, the combination of an electrolyte-compartment, a cathode formed by a layer of mercury forming the bottom of the electrolyte-compartment, an anode-compartment separated from the electrolyte-compartment by a horizontal porous diaphragm placed close to the layer of mercury, and means for causing a solution of the substance to be decomposed to flow through the electrolyte-compartment between the diaphragm and the mercury, substantially as described.

8. In an electrolytic cell, the combination of an electrolyte-compartment, a cathode formed by a layer of mercury forming the bottom of the electrolyte-compartment, an anode-compartment separated from the electrolyte-compartment by a horizontal porous diaphragm placed above the layer of mercury, and means for causing a solution of the substance to be decomposed to flow through the electrolyte-compartment between the diaphragm and the mercury, substantially as described.

9. In an electrolytic cell, the combination of a washing-chamber, a layer of mercury on the bottom of the washing-chamber, an open-bottom cell supported within the washing-chamber with its bottom in position to be sealed by the layer of mercury, an anode-compartment formed by a cell having its bottom formed by a porous diaphragm and supported within the first said cell so as to leave a space between the diaphragm and the mercury, means for causing a solution of the substance to be decomposed to flow through the space between the diaphragm and the mercury, and means for causing a relative horizontal reciprocating movement between the washing-chamber and said cells, substantially as described.

10. An electrolytic cell having a cathode formed by a layer of mercury forming the bottom of the electrolyte-compartment, an anode-compartment formed by a removable cell the sides of which are impervious and the bottom of which is formed by a porous diaphragm which separates the anode-compartment from the electrolyte-compartment when said removable cell is in place, and means for causing a solution of the substance to be decomposed to flow through the electrolyte-compartment between the diaphragm and the mercury cathode, substantially as described.

In testimony whereof I have hereunto set my hand in the presence of two subscribing witnesses.

HENRY S. ANDERSON.

Witnesses:
RANSOM L. BLACKMAN,
GEORGE P. BLAIR.